United States Patent [19]

Kraft et al.

[11] 4,142,038
[45] Feb. 27, 1979

[54] ACCELERATOR MIXTURE FOR UNSATURATED POLYESTER RESIN COMPOSITIONS

[75] Inventors: Klaus Kraft, Muelheim; Erich Eimers, Krefeld, both of Fed. Rep. of Germany

[73] Assignee: Bayer Aktiengesellschaft, Fed. Rep. of Germany

[21] Appl. No.: 845,561

[22] Filed: Oct. 26, 1977

[30] Foreign Application Priority Data

Oct. 29, 1976 [DE] Fed. Rep. of Germany ....... 2649268

[51] Int. Cl.$^2$ .............................................. C08G 63/68
[52] U.S. Cl. .................................... 528/288; 260/861; 260/864; 528/61; 528/83; 528/176; 528/183; 528/194

[58] Field of Search ................ 260/75 N, 75 TN, 861, 260/864; 528/61, 83, 176, 183, 194, 288

[56] References Cited

U.S. PATENT DOCUMENTS

| | | | |
|---|---|---|---|
| 3,502,602 | 3/1970 | Helm et al. .................... | 260/7 SN X |
| 3,641,203 | 2/1972 | Eimers et al. ................. | 260/75 N X |

*Primary Examiner*—Lucille M. Phynes
*Attorney, Agent, or Firm*—Connolly and Hutz

[57] ABSTRACT

Mixture of I. nucleus-unsubstituted or m-substituted N.N-dialkanol arylamides and II. p-substituted arylamines obtained by reaction of I. with diisocyanates and/or dicarboxylic acids work as excellent accelerators in unsaturated polyester resin compositions which then show a favorable pot-life, high stability in storage and rapidly obtainable sandability.

2 Claims, No Drawings

ACCELERATOR MIXTURE FOR UNSATURATED POLYESTER RESIN COMPOSITIONS

This invention relates to an accelerator mixture for cold-setting compositions, especially surfacing compositions, based on unsaturated polyester resins.

It is known that moulding compositions, especially surfacing compositions, based on cold-setting polyester cast resins can be hardened by using ω,ω'-disubstituted N,N-dialkylarylamines as a polymerisation accelerator (German Pat. No. 919,431). It is also known that N,N-bis-(β-hydroxyalkyl)-arylamines can be reacted with dicarboxylic acids to form a polyester or with diisocyanates to form a polyurethane and that the resulting products can be added to unsaturated polyester resin compositions as hardening accelerators (German Offenlegungsschrift No. 1,943,954 and German Pat. No. 1,643,972).

In addition to high flexibility and surface hardness, surfacing compositions are required after hardening to show two properties which are difficult to combine, namely:

1. a pot life which allows sufficient time for the hardening catalyst to be uniformly distributed in the resin composition and for applying the surfacing composition, in conjunction with high stability in storage, and
2. ready "sandability" of the treated surface as soon as possible after the surfacing composition has been applied.

Although sandability can be improved by a high accelerator concentration, albeit at the expense of pot life and stability in storage, any attempt to improve pot life and stability in storage by reducing the accelerator concentration and/or increasing the inhibitor content results in a deterioration in sandability.

An object of the present invention is to provide a method of accelerating unsaturated polyester resin compositions which is not attended by any of the above-mentioned disadvantages of conventional amine accelerators.

It has surprisingly been found that a mixture of

A. a tertiary amine of the type used for example in the process according to German Pat. No. 919,431, and
B. a polyester, polyurethane or polyester urethane of the type described as accelerators, for example, in German Offenlegungsschrift No. 1,943,954 and German Pat. No. 1,643,972, is superior to known amine accelerators in that it shows an advantageous combination of a favourable pot life, high stability in storage and rapidly obtainable sandability.

The present invention provides a mixture of

A. 50 to 10% by weight and preferably 33 to 25% by weight of an N,N-dialkanol arylamine corresponding to the formula:

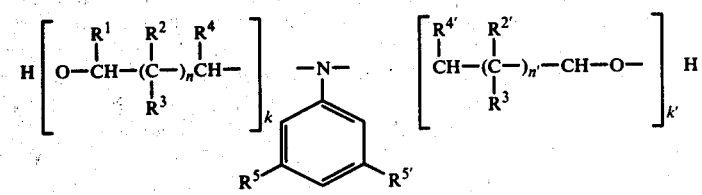

in which $R^1$ to $R^4$ and $R^{1'}$ to $R^{4'}$ represent a hydrogen atom or an optionally hydroxyl-substituted alkyl radical with 1 to 4 carbon atoms, $R^5$ and $R^{5'}$ represent a hydrogen atom or an alkyl radical with 1 to 4 carbon atoms, k and K' represent an integer from 1 to 5 and n and n' represent 0 or 1; and B. 50 to 90% by weight and preferably 67 to 75% by weight of compounds or mixtures of compounds obtained by reacting I. N,N-dialkanol arylamines HO-D-OH, in which D represents

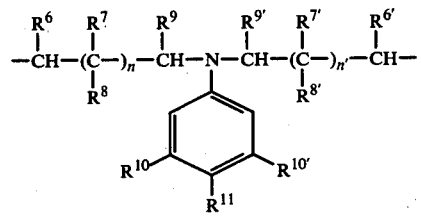

in which n and n' = 0 or 1, $R^{10}$ and $R^{10'}$ represent a hydrogen atom or an alkyl radical with 1 to 4 carbon atoms, $R^{11}$ represents an alkyl radical with 1 to 4 carbon atoms, and $R^6$ to $R^9$ and $R^{6'}$ to $R^{9'}$ have the meanings defined above for $R^1$ to $R^4$ and $R^{1'}$ to $R^{4'}$, II. a. with 0.5 to 0.91 mole, based on 1 mole of (I), of a dicarboxylic acid HOOC—$R^{12}$—COOH, in which $R^{12}$ represents an alkylene radical with 2 to 10 carbon atoms, a cycloalkylene or cycloalkylene radical with 6 to 7 carbon atoms, or an arylene radical with 6 to 10 carbon atoms optionally substituted by 1 to 4 chlorine or bromine atoms; or b. with 0.5 to 0.91 mole, based on 1 mole of (I), of a diisocyanate corresponding to the formula OCN—$R^{13}$—NCO, in which $R^{13}$ represents an alkylene radical with 4 to 6 carbon atoms, a cycloalkylene radical with 6 to 10 carbon atoms, an optionally alkylsubstituted arylene radical with 6 to 15 carbon atoms, an alkylene-bis-(phenylene)-radical with 13 to 16 carbon atoms, or a difunctional aliphatic or cycloaliphatic radical with 7 to 12 carbon atoms; or c. with dicarboxylic acids (a) and diisocyanates (b), the molar ratio of dialkanol arylamine (I) : (dicarboxylic acid (a) + diisocyanate (b)) having to be in the range of from 1.1:1 to 2.0:1.

The invention also relates to the use of this mixture for accelerating unsaturated polyester resin compositions, especially surfacing compositions based on unsaturated polyester resins.

For example, a large proportion of the polyesters, polyurethanes and polyester urethanes (B) may be represented by the formula:

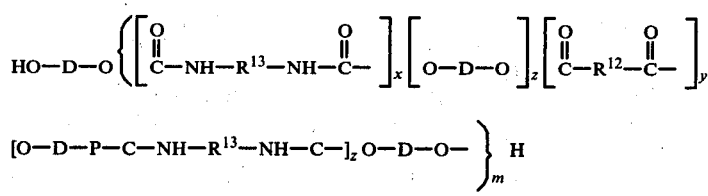

in which m is an integer from 1 to 10,
x, y and z = 0 or 1, with the proviso that
x + y = 1 or 2 and
z = ...¹..... only when x = y = 1, and in which D is as defined above.

The N,N-dialkanol arylamines on which component (B) is based and the N,N-dialkanol arylamines (A) are known and may be obtained in known manner, for example by reacting the arylamines with alkylene oxides.

Examples of the N,N-dialkanol arylamines HO—D—OH on which component (B) is based are:
N,N-bis-(β-hydroxyethyl)- and -(β-hydroxypropyl)-p-toluidine,
N,N-bis-(β-hydroxypropyl)-p-tert.-butyl aniline,
N,N-bis-(β-hydroxyethyl)-3,4-dimethyl aniline,
N,N-bis-(β-γ-dihydroxypropyl)-p-toluidine, N,N-bis-(2,2-dimethylol-n-butyl)-p-toluidine,
Bis-(β-hydroxy-β-vinylethyl)p-ethyl aniline,
Bis-(β-hydroxyethyl)-p-tert.-butyl aniline,
N-β-hydroxyethyl-N-β-hydroxy-β-vinylethyl-p-toluidine, and
N,N-β-hydroxypropyl-β-hydroxyethyl-p-toluidine.

The reaction of the N,N-dialkanol arylamine on which component (B) is based to form a diester or polyester (B) (x = z = 0; y = 1) may be carried out in known manner by melt condensation with 0.5 to 0.91 mole, based on 1 mole of amine, of the particular dicarboxylic acid at temperatures of from 150 to 250° C. and preferably at temperatures of from 170 to 200° C., optionally in the presence of esterification catalysts.

Dicarboxylic acids suitable for esterification of the hydroxyl groups of the amine are, for example, succinic acid, adipic acid, sebacic acid, cyclohexane-1,2- and 1,4-dicarboxylic acid, Δ-4-tetrahydrophthalic acid, endomethylene tetrahydrophthalic acid, phthalic acid, isophthalic acid and terephthalic acid, tetrachloro and tetrabromophthalic acid. Instead of using the free acids, it is of course also possible to use their anhydrides, esters or semiesters (for example those of alcohols with 1 to 4 carbon atoms, preferably methyl esters). Suitable transesterification catalysts, are, for example, sodium hydroxide, potassium methylate, titanium tetrabutylate, zirconium salts and dibutyl tin oxide.

The reaction of the N,N-dialkanol arylamine on which component (B) is based to form a diurethane or polyurethane (B) (y = z = 0; x = 1) may be carried out in known manner by urethanisation with 0.5 to 0.91 mole, based on 1 mole of amine, of the particular diisocyanate, preferably in an inert solvent, at temperatures in the range of from 20 to 150° C. and preferably at temperatures in the range of from 50 to 100° C.

Diisocyanates suitable for urethanisation of the hydroxyl groups of the amine are, for example, tetramethylene and hexamethylene diisocyanate, phenylene-1,4-diisocyanate, tolylene diisocyanate, diphenyl methane-2,4'- and 4,4'-diisocyanate, triisopropyl benzene diisocyanate, naphthylene-1,5-diisocyanate and "isophorone" diisocyanate

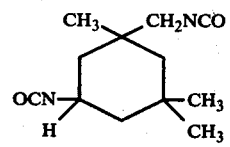

Solvents suitable for the urethanisation reaction are hydrocarbons such as, for example, benzene, toluene, xylene, chlorobenzene or o-dichlorobenzene; other suitable solvents are monomers which are inert to isocyanates and which can be copolymerised with unsaturated polyesters, such as styrene for example.

The polyester urethanes (B) (for example x = y = z = 1; the above formula does not reproduce the polyester urethanes with statistical distribution of the diisocyanate and dicarboxylic acid radicals which can also be used in accordance with the invention) may be produced from 1.1 to 2.0 moles of (dicarboxylic acid + diisocyanate) per mole of dialkanol arylamine, generally by a two-stage process. In the first stage, some of the hydroxyl groups of the amine are converted into ester groups by heating with the dicarboxylic acid; in the second stage, more hydroxyl groups of the dicarboxylic acid diester are urethanised with diisocyanates.

To synthesise component (B), one or more amines may be combined with one or more dicarboxylic acids and/or one or more diisocyanates.

N,N-Dialkanol arylamines suitable for use as component (A) are, for example, N,N-bis-(β-hydroxyethyl)-aniline, N,N-bis-(β-hydroxypropyl)-m-toluidine, N,N-bis-(β-hydroxyethyl)-3,5-dimethylaniline, N-ethyl-N-β-hydroxypropyl-m-toluidine, N-methyl-N-β-hydroxyethyl-3,5-dimethylaniline, N-ethyl-N-β-hydroxypropyl aniline, N-methyl-N-β-hydroxypropyl aniline and N-β-hydroxyethyl-N-ε-hydroxy-γ-oxapentyl-m-toluidine.

Components (A) and (B) may be combined with one another in the usual way, i.e. for example by stirring at 20 to 100° C. Up to 25% by weight, based on the sum of (A) and (B), of solution promoters may be added in order to prevent component (A) from crystallising out of the mixture. Suitable solution promoters are any inert organic solvents, preferably polar solvents, such as methanol, ethanol, acetic acid ethyl and butyl ester, and also vinyl monomers copolymerisable with the unsaturated polyesters such as, for example, methyl methacrylate, ethylacrylate, tert.-butyl acrylate, N-methoxy methacrylamide, N-vinyl caprolactam and N-vinyl pyrrolidone.

In addition to the above-mentioned vinyl monomers, any vinyl monomers copolymerisable with the unsaturated polyesters (see below) may be used as viscosity-reducing solvents in which the accelerators or the amines may be dissolved during the actual reaction with the diisocyanates.

The polyester resin compositions to be accelerated are usually based on α,β-ethylenically unsaturated polyesters and vinyl or vinylidene compounds copolymerisable therewith.

α,β-Ethylenically unsaturated polyesters of this type are the usual polycondensation products of (i) at least one α,β-ethylenically unsaturated dicarboxylic acid generally containing 4 or 5 carbon atoms or its ester-forming derivatives, optionally in admixture with up to 90 mole %, based on the unsaturated acid components, of at least one aliphatic saturated dicarboxylic acid containing from 4 to 10 carbon atoms or a cycloaliphatic dicarboxylic acid containing from 8 to 10 carbon atoms or their ester-forming derivatives, with (ii) at least one polyhydroxy compound, more especially a dihydroxy compound, containing from 2 8 carbon atoms, i.e. polyesters of the type described, for example, by J. R. Lawrence in "Polyester Resins", Reinhold Publ. Corp., New York 1960, pages 18 et seq, and by Goerden-Vieweg in Kunststoff-Handbuch, Vol, VIII ("Polyester"), Carl Hanser Verlag, Munich 1973, pages 247 to 312.

Examples of preferred unsaturated dicarboxylic acids or their derivatives are maleic acid or maleic acid anhydride and fumaric acid. However, it is also possible to use, for example, mesaconic acid, citraconic acid, itaconic acid or chloromaleic acid. Examples of the aliphatic saturated dicarboxylic acids and cycloaliphatic dicarboxylic acids or their derivatives used in accordance with the invention are phthalic acid or phthalic acid anhydride, isophthalic acid, terephthalic acid, hexahydro or tetrahydrophthalic acid or their anhydrides, endomethylene tetrahydrophthalic acid or its anhydride, succinic acid or succinic acid anhydride and succinic acid esters and chlorides, adipic acid and sebacic acid. In order to produce substantially non-inflammable resins, it is possible to use, for example, hexachloroendomethylene tetrahydrophthalic acid (HET-acid), tetrachlorophthalic acid or tetrabromophthalic acid. Preferred polyesters contain maleic acid residues of which from 25 mole % to 75 mole % may be replaced by phthalic acid orisophthalic acid residues. Suitable dihydric alcohols are ethylene glycol, 1,2-propane diol, 1,3-propane diol, diethylene glycol, dipropylene glycol, thiodiglycol, 1,3-butane diol, 1,4-butane diol, neopentyl glycol, 1,6-hexane diol, 2,2-bis-(4-hydroxy-cyclohexyl)-propane, bis-alkoxylated bisphenol A, perhydro bisphenol and others. It is preferred to use ethylene glycol, 1,2-propane diol, diethylene glycol and dipropylene glycol.

Further modifications are possible by incorporating up to 10 mole %, based on the alcohol or acid component, of monohydric, trihydric and tetrahydric alcohols containing from 1 to 6 carbon atoms, such as methanol, ethanol, butanol, allyl alcohol, benzyl alcohol, cyclohexanol and tetrahydrofurfuryl alcohol, trimethylol propane, glycerol and pentaerythritol, and of mono-, di- and tri-allyl ethers and benzyl ethers of trihydric and polyhydric alcohols containing from 3 to 6 carbon atoms according to German Auslegeschrift No. 1,024,654, and also by incorporating monobasic acids, such as benzoic acid or long-chain unsaturated fatty acids, such as oleic acid, linseed oil fatty acid and ricinene fatty acid.

The acid numbers of the polyesters usually amount to between 1 and 100 and preferably to between 20 and 70, their OH-numbers to between 10 and 150 and preferably to between 20 and 100, and the molecular weights measured as number averages ($\overline{M}_n$) to between about 500 and 5000 and preferably to between about 1000 and 3000 (as measured by vapour pressure osmometry in dioxane and acetone; in the case of differing values, the lower value is taken as the correct value.

Suitable copolymerisable vinyl and vinylidene compounds are the unsaturated compounds commonly encountered in polyester technology which preferably contain α-substituted vinyl groups or β-substituted allyl groups, preferably styrene, and also, for example, nucleus-chlorinated and — alkylated or — alkenylated styrenes, the alkyl groups containing from 1 to 4 carbon atoms, such as for example vinyl toluene, divinyl benzene, α-methyl styrene, tert.-butyl styrene or chlorostyrenes; vinyl esters of carboxylic acids with 2 to 6 carbon atoms, preferably vinylacetate; vinyl pyridine, vinyl naphthalene, vinyl cyclohexane, acrylic acid and methacrylic acid and/or their esters (preferably vinyl, allyl and methallyl esters) with 1 to 4 carbon atoms in the alcohol component, their amides and nitriles, maleic acid anhydride, semiesters and diesters with 1 to 4 carbon atoms in the alcohol component, semiamines and diamines or cyclic imides such as N-methyl maleic imide or N-cyclohexyl maleic imide; allyl compounds, such as allyl benzene, and allyl esters, such as allyl acetate, phthalic acid diallyl ester, isophthalic acid diallyl ester, fumaric acid diallyl ester, allyl carbonates, diallyl carbonates, triallyl phosphate and triallyl cyanurate.

The polyester cast resins generally contain from 30 to 75 parts by weight of polyester and from 70 to 25 parts by weight of copolymerisable vinyl or vinylidene compounds.

The accelerator mixture according to the invention may be added to the polyester resins in quantities of from 0.1 to 10% by weight and preferably in quantities of from 0.5 to 5% by weight, based on the sum of polyester + vinyl or vinylidene compound. Components (A) and (B) of the accelerator mixture may, of course, also be separately added to the polyester or cast resin and dissolved at temperatures in the range of from 20° to 120° C.

In order to protect the polyester resin compositions against undesirable premature polymerisation, it is advisable to add during their actual production from 0.001 to 0.1 part by weight of polymerisation inhibitors or antioxidants, based on 100 parts by weight of the mixture of unsaturated polyester and copolymerisable monomers. Suitable auxiliaries of this type are, for example, phenols or phenol derivatives, preferably sterically hindered phenols which contain alkyl substituents with 1 to 6 carbon atoms in both o-positions to the phenolic hydroxy group, amines, preferably secondary arylamines and their derivatives, quinones, copper salts of organic acids, addition compounds of copper(I) halides with phosphites such as, for example, 4,4-bis-(2,6-di-tert.-butyl-phenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,5-di-tert.-butyl-4-hydroxybenzyl phosphonic acid diethyl ester, N,N'-bis-(β-naphthyl)-p-phenylene diamine, N,N'-bis-(1-methyl-heptyl)-p-phenylene diamine, phenyl-β-naphthylamine, 4,4'-bis-(α,α-dimethylbenzyl)-diphenylamine, 1,3,5-tris-(3,5-di-tert.-butyl-4-hydroxyhydrocinnamoyl)-hexahydro-s-triazine, hydroquinone, p-benzoquinone, toluhydroquinone, trimethyl hydroquinone, 3,5-di-tert.-butyl hydroquinone, 2,6-di-tert.-butyl hydroquinone, 3,5- dibutyl quinone, p-tert.-butyl pyrocatechol, chloranil, bromanil, naphthoquinone, copper naphthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite or p-nitrosodimethyl aniline. Other suitable stabilisers are described in "Methoden der organischen Chemie" (Houben-Weyl), 4th Edition, Vol. XIV/1, pages 433–452, 756, Georg Thieme-Verlag, Stuttgart, 1961. p-Benzoquinone for example, used in a concentration of from 0.01 to 0.05 part by weight, based on the polyester resin, is particularly suitable.

To produce surfacing compositions, fillers such as chalk, talcum, baryta, Aerosil or Asbestine are added to the polyester resins in quantities of from 50 to 350 parts by weight based on 100 parts by weight of the polyester resin. Dyes or pigments may of course also be added. The various components of the moulding compositions according to the invention are best mixed in kneaders, dissolvers, on roll stands and, for small-scale tests, even in mortars.

Polymerisation initiators are added to the surfacing compositions before hardening in the usual quantities, preferably in quantities of from 0.1 to 5 parts by weight, based on 100 parts by weight of the mixture of unsaturated polyester and copolymerisable monomers. Suitable polymerisation initiators are, in particular, diacyl peroxides and percarbonates such as diacetyl peroxide, dibenzoyl peroxide, di-p-chlorobenzoyl peroxide, phthaloyl peroxide, succinyl peroxide, dilauroyl peroxide, acetyl cyclohexane sulphonyl peroxide, isopropyl percarbonate, cyclohexyl percarbonate and bis-(4-tert.-butyl-cyclohexyl)-percarbonate.

Surfacing compositions containing the accelerator mixture according to the invention are distinguished from surfacing compositions containing either only component (A) or only component (B) as accelerator by improved dry sandability for the same pot life. In addition, the stability in storage of polyester resins containing the accelerator mixture according to the invention is distinctly increased in relation to that of resins which contain dimethyl aniline as accelerator either on its own or in admixture with other amines. In the event of prolonged storage of the resins containing the accelerator combination according to the invention, there is no sign of any reduction in activity.

The quality-improving effect of component (A) with the structure of nucleus-unsubstituted or m-substituted arylamines, which are known to be less reactive than the p-substituted arylamines on which component (B) is based, was altogether surprising.

The surfacing compositions containing the accelerators according to the invention are suitable, for example, for priming coachwork panels, plastics sheeting and prefabricated concrete sections.

EXAMPLES

The percentages quoted in the following Examples represent % by weight and the parts quoted represent parts by weight.

Production of polyester cast resin I:

A polyester produced by melt condensation from 47 moles of maleic acid anhydride, 53 moles of phthalic acid anhydride and 108 moles of 1,2-propylene glycol is dissolved in styrene with the addition of 0.036% of hydroquinone and 25 ppm of copper naphthenate, based on the styrene-containing cast resin, to form a solution with a solids content of 70%. This polyester cast resin has an acid number of 32.

Production of Polyester cast resin II:

A styrene-containing polyester cast resin with a solids content of 70% is produced from 25 moles of maleic acid anhydride and 26.25 moles of triethylene glycol by melt condensation followed by the addition of 10 moles of dicyclopentadiene. 0.03% of hydroquinone and 20 ppm of copper nephthenate are added to the polyester cast resin.

Surfacing compositions are produced from these resins in accordance with the following recipe:

100 parts of the polyester cast resin with the particular amine accelerator, 60 parts of talcum AT 1, 120 parts by baryta, 2 parts of Aerosil 200 and 2 parts of hydroquinone (1% in ethyl acetate) are mixed in a forced circulation kneader. For hardening, the surfacing compositions are stirred with 2.5 parts of a standard commercial-grade benzoyl peroxide paste. This composition is coated onto sheets of tin plate in a layer thickness of approximately 1 mm.

Production of amine accelerator I:

A polyester is produced by polycondensation from 1 mole of N,N-bis-(β-hydroxypropyl)-p-toluidine and 0.774 mole of adipic acid and is dissolved in styrene with the addition of 0.1% of hydroquinone to form a solution with a solids content of 70%.

Production of amine accelerator II:

1 mole of adipic acid and 2 moles of N,N-bis-(β-hydroxy propyl)-p-toluidine are esterified in the usual way at 180° C. until the acid number has fallen to below 5. The reaction mixture is cooled to approximately 50° C. Nitrogen is passed over. The resin is dissolved in 50 parts of xylene. 0.8 mole of isophorone diisocyanate are then added over a period of 1 hour, the temperature of the reaction mixture rising to approximately 60° C. on account of a slight heat effect. The reaction mixture is then heated for 4 hours to 80°–90° C. Thereafter no more free isocyanate can be detected. The resin is dissolved in styrene with the addition of 0.05% of hydroquinone to form a solution with a solids content of 70%.

Comparison Test 1:
Surfacing composition of 100 parts of polyester cast resin I + 1.5 parts of dimethyl aniline.

Comparison Test 2:
Surfacing compositions of 100 parts of polyester cast resin I + 3 parts of amine accelerator I.

Comparison Test 3:
Surfacing composition of 100 parts of polyester cast resin I + 1.7 parts of N,N-bis-(β-hydroxyethyl)-m-toluidine.

Comparison Test 4:
Surfacing composition of 100 parts of polyester cast resin I + 1.7 parts of accelerator I + 0.5 part of dimethyl aniline.

Test 5 according to the invention:
Surfacing composition of 100 parts of polyester cast resin I + 1.8 parts of accelerator I + 0.6 part of N,N-bis-(β-hydroxyethyl)-aniline.

Test 6 according to the invention:
Surfacing composition of 100 parts of polyester cast resin I + 8 parts of accelerator I + 0.5 part of bis-(β-hydroxyethyl)-m-toluidine.

Test 7 according to the invention:
Surfacing composition of 100 parts of polyester cast resin I + 3 parts of accelerator II + 0.5 part of N,N-bis-(β-hydroxyethyl)-m-toluidine.

Comparison Test 8:

Surfacing composition of 100 parts of polyester cast resin II + 3 parts of accelerator I.

Test 9 according to the invention:

Surfacing composition of 100 parts of polyester cast resin II + 3 parts of accelerator II + 0.5 part of N,N-bis-(β-hydroxyethyl)-m-toluidine.

In all tests, the pot life after hardening with 2.5% of benzoyl peroxide paste amounted to approximately 5 minutes at 20° C.

In the following Table, the sandability of the coatings of surfacing compositions is shown in dependence upon the time after addition of the benzoyl peroxide paste. The numbers used in the Table have the following meaning:

1. very good sandability (no clogging of the paper)
2. good sandability (slight clogging of the paper, sanding dust can be almost completely knocked off)
3. moderate sandability (distinct clogging of the paper)
4. poor sandability (heavy clogging of the paper paper unuseable after a short time)
5. zero sandability (surfacing tool slides on the surface of the sandpaper).

Sandability was tested by one and the same person manually sanding the coatings of surfacing composition with medium-fine grain (80) sandpaper.

In the stability in storage column, the stability of the amine-accelerated polyester cast resin at 50° C. is shown in days.

| Test | Dry sandability after 15 | 20 | 30 mins | Stability in storage of the resin at 50° C in days |
|---|---|---|---|---|
| Comparison Test 1 | 4 | 4 | 3 | 10 |
| Comparison Test 2 | 5 | 5 | 4 | 200 |
| Comparison Test 3 | 4 | 3 | 3 | 50 |
| Comparison Test 4 | 3 | 3 | 2 | 18 |
| Test 5 according to the invention | 4 | 3 | 2 | 190 |
| Test 6 according to the invention | 3 | 2 | 2 | 180 |
| Test 7 according to the invention | 3 | 2 | 2 | 200 |
| Comparison Test 8 | 5 | 5 | 5 | 300 |
| Test 9 according to the invention | 4 | 4 | 3 | 250 |

We claim

1. A mixture of
   A. 50 to 10% by weight, preferably 33 to 25% by weight, of an N,N-dialkanol arylamine corresponding to the formula:

$$H\left[O-CH-(C-)_n CH-\atop {R^1 \atop R^3}{R^2 \atop }{R^4 \atop }\right]_k -N- \left[CH-(C-)_{n'}-CH-O-\atop {R^{4'} \atop R^3}{R^{2'} \atop }{R^{1'} \atop }\right]_k H$$

(with aryl group bearing $R^5$ and $R^{5'}$)

in which
$R^1$ to $R^4$ and $R^{1'}$ to $R^{4'}$ represent a hydrogen atom or an optionally hydroxyl-substituted alkyl radical with 1 to 4 carbon atoms, $R^5$ and $R^{5'}$ represent a hydrogen atom or an alkyl radical with 1 to 4 carbon atoms,
k and k' represent an integer from 1 to 5, and
n and n' = 0 or 1; and B. 50 to 90% by weight, preferably 67 to 75% by weight of compounds or mixtures of compounds obtainable by reacting I. N,N-dialkanol arylamines HO—D—OH in which D represents $$-CH-(C-)_n-CH-N-CH-(C-)_{n'}-CH-\atop {R^6 \atop R^8}{R^7 \atop }{R^9 \atop }{R^{9'} \atop }{R^{7'} \atop }{R^{6'} \atop R^{8'}}$$

(with aryl group bearing $R^{10}$, $R^{10'}$, $R^{11}$)

in which
n and n' = 0 or 1,
$R^{10}$ and $R^{10'}$ represent a hydrogen atom or an alkyl radical with 1 to 4 carbon atoms,
$R^{11}$ represents an alkyl radical with 1 to 4 carbon atoms, and
$R^6$ to $R^9$ and $R^{6'}$ to $R^{9'}$ have the meanings defined above for $R^1$ to $R^4$ and $R^{1'}$ to $R^{4'}$, II. (a) with 0.5 to 0.91 mole, based on 1 mole of (I), of a dicarboxylic acid HOOC—$R^{12}$—COOH in which
$R^{12}$ represents an alkylene radical with 2 to 10 carbon atoms, a cycloalkylene or cycloalkenyl radical with 6 or 7 carbon atoms, or an arylene radical with 6 to 10 carbon atoms optionally substituted by 1 to 4 chlorine or bromine atoms; or (b) with 0.5 to 0.91 mole, based on 1 mole of (I), of a diisocyanate corresponding to the formula OCN—$R^{13}$—NCO, in which
$R^{13}$ represents an alkylenyl radical with 4 to 6 carbon atoms, a cycloalkylene radical with 6 to 10 carbon atoms, an optionally alkyl-substituted arylene radical with 6 to 15 carbon atoms, an alkylene-bis-(phenylene)-radical with 13 to 16 carbon atoms, or a dihydric aliphatic or cycloaliphatic radical with 7 to 12 carbon atoms; or (c) with dicarboxylic acids (a) and diisocyanates (b) the molar ratio of dialkanol arylamines (I): (dicarboxylic acid (a) + diisocyanate (b)) having to be in the range of from 1.1:1 to 2.0:1.

2. The use of the mixture claimed in claim 1 for accelerating unsaturated polyester resin compositions, especially surfacing compositions based on unsaturated polyester resins.

* * * * *